United States Patent
Schulz et al.

(10) Patent No.: US 9,282,002 B2
(45) Date of Patent: Mar. 8, 2016

(54) METHOD FOR OPERATING A REMOTE CONTROLLED NETWORK ELEMENT

(75) Inventors: Mario Schulz, Geithain (DE); Juergen Maurer, Bad Neuenahr / Ahrweiler (DE)

(73) Assignee: DEUTSCHE TELEKOM AG, Bonn (DE)

( * ) Notice: Subject to any disclaimer, the term of this patent is extended or adjusted under 35 U.S.C. 154(b) by 261 days.

(21) Appl. No.: 13/879,030

(22) PCT Filed: Oct. 13, 2011

(86) PCT No.: PCT/EP2011/005131
§ 371 (c)(1),
(2), (4) Date: Apr. 12, 2013

(87) PCT Pub. No.: WO2012/048873
PCT Pub. Date: Apr. 19, 2012

(65) Prior Publication Data
US 2013/0219031 A1 Aug. 22, 2013

Related U.S. Application Data

(60) Provisional application No. 61/393,708, filed on Oct. 15, 2010.

(30) Foreign Application Priority Data

Oct. 15, 2010 (DE) .................................. 100 13 690

(51) Int. Cl.
G06F 15/16 (2006.01)
H04L 12/24 (2006.01)
H04L 29/06 (2006.01)

(52) U.S. Cl.
CPC ........ H04L 41/0813 (2013.01); H04L 41/0672 (2013.01); H04L 41/082 (2013.01); H04L 41/0863 (2013.01); H04L 63/164 (2013.01)

(58) Field of Classification Search
CPC ... H04L 41/082; H04L 63/0272; H04L 63/20; H04L 12/4679; H04L 41/0806; H04L 63/0823; H04L 41/0803; H04L 41/0863; H04L 29/12066; H04L 41/0886; H04L 61/103; H04L 61/1511; H04L 61/2015; H04L 61/2076; H04L 63/164; H04W 24/02; H04W 88/08; H04W 8/26; H04W 92/045; G06F 15/177

See application file for complete search history.

(56) References Cited

U.S. PATENT DOCUMENTS 7,409,709 B2 * 8/2008 Smith et al. ..................... 726/15
7,496,950 B2 * 2/2009 Carley ............................. 726/3

(Continued)

FOREIGN PATENT DOCUMENTS

| CA | 2680599 A1 * | 12/2009 | ............ H04L 41/082 |
| DE | 102007028809 A1 | 12/2007 | |
| EP | 1761085 A1 | 3/2007 | |

OTHER PUBLICATIONS

Cisco Systems, Inc., Digital Certificates/PKI for IPSec VPNs, 2005, pp. 3-29.*

*Primary Examiner* — Ario Etienne
*Assistant Examiner* — Thorne E Waugh
(74) *Attorney, Agent, or Firm* — Leydig, Voit & Mayer, Ltd.

(57) ABSTRACT

A method for operating a remote-controlled network element in a telecommunication network includes: configuring the network element with a new configuration; determining whether a network connection failure between the network element and a network management system of the telecommunication network exists after the configuration; and in response to detecting a network connection failure, setting the network element automatically to a standard configuration and establishing a network connection between the network element and the network management system using the standard configuration. Setting the network element automatically to a standard configuration and establishing the network connection includes: loading a previous IPSec certificate in case that the previous Internet Protocol Security (IPSec) certificate has been at least partly replaced during the configuration; and establishing the network connection between the network element and the network management system using the previous IPSec certificate.

13 Claims, 1 Drawing Sheet

(56) References Cited

U.S. PATENT DOCUMENTS

| | | |
|---|---|---|
| 8,739,289 B2* | 5/2014 | Nice et al. ................ 726/25 |
| 2002/0097724 A1* | 7/2002 | Halme et al. .............. 370/392 |
| 2002/0157018 A1* | 10/2002 | Syvanne ................ 713/200 |
| 2007/0277226 A1* | 11/2007 | Smith et al. ................ 726/3 |
| 2009/0307379 A1* | 12/2009 | Mohl ........................ 710/8 |
| 2013/0124701 A1* | 5/2013 | Klatt et al. ................ 709/220 |

* cited by examiner

METHOD FOR OPERATING A REMOTE CONTROLLED NETWORK ELEMENT

CROSS-REFERENCE TO RELATED APPLICATIONS

This application is a U.S. National Phase application under 35 U.S.C. §371 of International Application No. PCT/EP2011/005131, filed on Oct. 13, 2011, and claims benefit to U.S. Provisional Application No. 61/393,708, filed Oct. 15, 2010, and European Patent Application No. EP 10013690.2, filed on Oct. 15, 2010. The International Application was published in English on Apr. 19, 2012 as WO 2012/048873 A1 under PCT Article 21(2).

FIELD

The present invention relates to operating a remote controlled network element in a telecommunication network.

BACKGROUND

A network element usually comprises a manageably logical entity uniting one or more physical devices which is embedded in a telecommunication network, e.g. a conventional or mobile telephone network, TCP/IP data networks, Internet and the like. Typical examples for network elements are transceiver stations, network controllers, routers, server, telephone exchanges and the like. Conventional network elements can be remote-controlled over the telecommunication network, e.g. a router interconnecting several computer networks can be configured by a client application on a computer over the computer network. In this way, remotely controlled reconfigurations of the network element are also performed. Furthermore, remote controlled changes and updates of encryption certificates, e.g. providing encrypted tunnel connections using SSL (Secure Socket Layer), TLS (Transport Layer Security) or IPsec (Internet Protocol Security) connections, are possible.

Disadvantageously, conventional network elements do not take any measures after a (remotely controlled) configuration change or certificate update regarding whether a reconnect to the network is possible or not. The result is that if the configuration change or the certificate update was incorrect the network element is no longer reachable over the network. Such incorrect changes cannot be undone by remote control. Solving problems that arise with incorrect re-configurations requires a site visit at the place of the network element by a service technician who restores the previous configuration or brings the network element into service, which is an expensive and time consuming procedure.

SUMMARY

In an embodiment, the present invention provides a method for operating a remote-controlled network element in a telecommunication network. The method includes: configuring the network element with a new configuration; measuring whether a network connection failure between the network element and a network management system of the telecommunication network exists after the configuration; and in response to detecting a network connection failure, setting the network element automatically to a standard configuration and establishing a network connection between the network element and the network management system using the standard configuration. Setting the network element automatically to a standard configuration and establishing the network connection includes: loading a previous IPSec certificate in case that the previous Internet Protocol Security (IPSec) certificate has been at least partly replaced during the configuration; and establishing the network connection between the network element and the network management system using the previous IPSec certificate.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
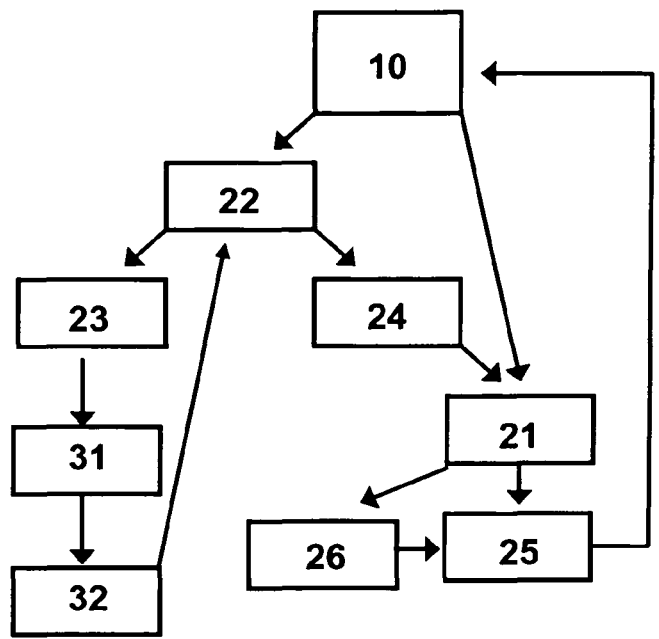
FIG. 1 illustrates schematically a method for operating a remote controlled network element according to an embodiment of the present invention.

In an embodiment, the present invention provides a method for controlling a network element in a telecommunication network in such a manner that the network element detects and rectifies failures arising with incorrect configuration procedures in a self-contained manner.

A method is provided for operating a remote controlled network element in a telecommunication network comprising a first step of remotely configuring the network element, a second step of measuring if a network connection failure between the network element and a network management system of the telecommunication network exists after the network element has been remotely configured in the first step, and a third step of setting the network element automatically to a former configuration and establishing a network connection between the network element and the network management system using the former configuration when a network connection failure has been detected in the second step.

Furthermore, a method is provided for operating a remote controlled network element in a telecommunication network comprising a first step of configuring, especially remotely configuring, the network element with a new configuration, a second step of measuring if a network connection failure between the network element and a network management system of the telecommunication network exists after the network element has been configured, especially remotely, in the first step, and a third step of setting the network element automatically to a standard configuration and establishing a network connection between the network element and the network management system using the standard configuration when a network connection failure has been detected in the second step, wherein the third step comprises a step of loading a previous IPSec certificate in case that the previous IPSec certificate has been at least partly replaced in the first step, wherein the third step further comprises a step of establishing a network connection between the network element and the network management system using the previous IPSec certificate and preferably a step of requesting a new IPSec certificate.

According to the present invention, it is thereby advantageously possible that the network element is still accessible over the telecommunication network even if an incorrect configuration of the network element has occurred. Consequently, the invention includes substantially a method for self-debugging or self-healing errors in a configuration of a remote controlled network element because the network element is automatically configured with a standard (especially a previous or former) configuration or setup when a network connection failure is detected. As such, it is guaranteed that the network element is always remote-controllable after a re-configuration process: if not with the new configuration then at least with the standard configuration or setup. It is preferred according to the present invention that the standard configuration corresponds to the previous configuration of the network element, or that the standard configuration corresponds to one of a plurality of previous configurations of the network element, preferably the last functioning configuration (of the plurality of previous configurations of the network element), or that the standard configuration corresponds to a certain default setup (like an emergency setup), or that the standard configuration corresponds to a factory setting of the network element. In particular, the configuration procedure of the network element in the first step comprises a reconfiguration process of the network element during a normal operating mode of the network element or an initial setup procedure during initially installing the network element or new network parts for the first time, e.g. based on Plug and Play. The wording "automatically" as used herein means that the network element switches back to the previous configuration without any need for remote access.

According to a preferred embodiment of the present invention, the standard configuration of the network element used in the third step corresponds to a previous configuration of the network element, the standard configuration having been replaced, at least partly, by the new and corrupted (at least non-operational) configuration (occurring the connection failures) in the first step. Preferably, the third step comprises a step of loading a previous encryption certificate, especially a previous IPSec certificate, if the previous encryption certificate, especially the previous IPSec certificate, has been replaced in the first step. As such, it is guaranteed that the network element is still reachable over the telecommunication network at least by using the previous encryption certificate, especially the previous IPSec certificate, if the renewal and/or replacement of the functioning previous encryption certificate, especially the previous IPSec certificate was incorrect or not successful for some reasons, like using a wrong or already expired new encryption (especially IPSec) certificate, connection issues during (re-) configuration of the network element or during transmission of the new encryption (especially IPSec) certificate and the like. In particular, the third step comprises a step of establishing a network connection between the network element and the network management system using the previous IPSec certificate and a step of requesting a (further) new encryption certificate (especially an IPSec certificate). In this manner, a correct (further) new encryption or IPSec certificate can subsequently be loaded by using the previous (old) encryption or IPSec certificate for establishing a network connection between the network element and the network management system. If also the establishment of an error-free network connection by using the previous configuration is not possible, the network element is preferably set to the default setting and in particular to the factory setting in a fourth step, so that at least on the basis of the factory settings of the network element, a new initial configuration by the network element itself is feasible.

According to another preferred embodiment of the present invention, the network element is set directly to a default setting in the third step, i.e. the standard configuration corresponds to the default setting, which in particular comprises a factory setting of the network element. This is preferably useful when the first step comprises a step of initially installing the network element in the telecommunication network (e.g. by Plug and Play), because in Plug and Play processes several failure scenarios can appear and in this situation there is no functioning previous configuration of the networking device than can be drawn on. As such, it is guaranteed that the initial configuration of the network element can be repeated without manually restoring the factory setting of the network element. In particular, if an initial configuration fails due to connection issues or wrong data entry of relevant parameters, a new initial configuration can be performed. Preferably, the network element is also set directly to the default setting, when in the second step a network connection failure is detected due to a corrupted DHCP (Dynamic Host Control Protocol) configuration in the first step. This is preferably useful when the DHCP flow could not be completed, so that the network element can not retrieve an IP address or other necessary data, like IP-address of the configuration server. The default setting is needed in case of configuring the network element, especially an eNB (evolved Node B); the site-ID will be used for the identification of the network element (especially an eNB) during Plug and Play processes at OMC (Operations Management Center) config (configuration) server, for instance.

Preferably, the network element is set directly to the default setting, when a manual restoring command is received by the network element, so that the factory setting of the network element can advantageously be restored remote-controlled. In this case an identity information is needed in order to identify the network element. Consequently, the identity information is preferably not deleted during auto-restoring the factory or default settings.

According to another preferred embodiment of the present invention the third step is performed only after awaiting a certain time delay from detecting the network connection failure in the second step, wherein particularly the time delay is configurable, e.g. one second or 5 seconds or 10 seconds or 30 seconds or 60 seconds or 120 seconds. The network element has enough time to attempt the establishing of a network connection based on the present configuration before reloading the previous configuration or resetting the factory or default settings. Cumulatively or alternatively, the third step is preferably performed only after a plurality of network connection failures have been detected during the second step. The corresponding maximum number of detected network connection failures is also configurable, e.g. two network connection failures or three network connection failures or four network connection failures. For this purpose, it is guaranteed that reloading the previous configuration or resetting the factory settings is only performed after reaching a certain number of unsuccessful attempts.

According to a preferred embodiment a flag (i.e. a memory element storing an information that a reconfiguration of the network element is executed) within the network element is set in particular when critical parameters, like IP-addresses, encryption certificates, security associations, firewall rules, interfaces or the like, are configured or reconfigured in the first step. If no connection failures are measured in the second step, the flag is cleared. If a network connection to the network management system cannot be established in the second step and the flag is raised, the network element is restored automatically to the previous configuration in the third step. If the former configuration is also not working the network element is preferably restored to the factory or default settings.

It is possible and preferred according to the present invention that successive configurations of the network element (i.e. a plurality of previous configurations of the network element) are saved within the network element and that in case that, after a reconfiguration, a connection failure between the network element and the network management system occurs, a fallback to the previous configuration of the network element (i.e. the configuration that directly precedes the new configuration initiated by means of the reconfiguration) is realized and, in case that a connection failure also occurs with this previous configuration, another previous configuration (of the plurality of previous configurations) is used.

Another subject of the present invention is a program for controlling a network element performing a method according to the present invention. The network element could be a transceiver station of a radio access telecommunication network, for example. Preferably, the program runs on the network element.

Another subject of the present invention is a computer program product comprising the program for controlling a network element.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

FIG. 1 illustrates schematically a method for operating a remote controlled network element 2 (see FIG. 2) according to an embodiment of the present invention. The network element 2 is embedded in a telecommunication network 1 which is inter alia managed by a network management system 3. Generally, there are two different starting situations conceivable. In the first case, the network element 2 is connected to the telecommunication network 1 for the first time and consequently has to be initially configured for the first time. According to the second case, the network element 2 has already been integrated into the telecommunication network and gets reconfigured during a normal operating mode in order to update its configuration or to change codification certificates, for instance.

Starting with the first case, the network element 2 has to be configured initially by remote control over the telecommunication network 1 in a first step. Typically, suchlike initial configurations are performed by Plug and Play procedures 10. During Plug and Play procedures several failures scenarios are possible. Errors occur most frequently due to connection issues during the configuration procedure. If the configuration procedure fails, the network element 2 directly switches into a reconfiguration mode 21. If the configuration procedure can be finished without errors, the network element 2 performs a second step 22 measuring whether a network connection to the network management system 3 could be established or not. If no connection failures are detected, the network element 2 is configured correct and the configuration procedure finishes 23.

Afterwards, the network element 2 switches into a normal operating mode 31. In the normal operating mode 31 a (re-) configuration procedure 32 of the network element 2 can be started and performed, especially remote controlled over the telecommunication network 1 or the (re-) configuration procedure 32 can be triggered by the network element 2 itself. After finishing the (re-) configuration procedure 32 the network element 2 switches into the second step 22 again verifying of the (re-) configuration procedure has been finished successful.

If connection failures occur 24, the network element 2 detects that a configuration mistake 24 exists and switches from the second step 22 directly into the reconfiguration mode 21. Now, the third step is performed, wherein a factory or a default setting of the network element 2 is reloaded 25 and the network element 2 starts the Plug and Play procedure according to the first step 10 again.

According to the second case, the network element 2 has already been embedded into the telecommunication network 1. The existing configuration of the network element 2 merely should be modified or replaced for performing a configuration update (i.e. loading a new configuration) or loading a new encryption certificate (especially an IPSec certificate), for instance. In the first step the network element 2 is configured 32 over the telecommunication network 1, especially remotely configured but a triggering of the configuration process by the network element itself is also possible according to the present invention, especially the exchange of an encryption certificate. After finishing the (re-) configuration procedure 32, the network element 2 switches into the second step 22, verifying if the (re-) configuration procedure has been finished successful. The network element 2 attempts to establish a network connection to the network management system 3 based on the new setting in the second step 22. If connection failures cannot be detected, the network element 2 is configured correctly and the configuration procedure finishes 23. Afterwards, the network element 2 switches into a normal operating mode 31.

If connection failures occur 24, the network element 2 switches into the reconfiguration mode 21. According to the third step, a standard configuration, corresponding especially to the previous configuration of the network element, which has been replaced by the new configuration in the remotely controlled (re-) configuration step 32, is reloaded 26 or reused. Subsequently, the network element 2 preferably attempts to establish a network connection again, but this time on the basis of the standard configuration. If the network connection can be established, in particular the remote controlled reconfiguration procedure 32 can be started again or the network element 2 switch in normal operating mode 31. In case that establishing a network connection on the basis of the standard configuration (especially the previous configuration) is also not possible, the network element 2 is reset, in a fourth step, in such a manner that the factory or default setting of the network element 2 is restored 25 (or that another previous configuration (out of a plurality of previous configurations) is used). Subsequently, an initial configuration procedure as described under case one is started 10. The trigger that the configured network 2 is reconfigured automatically to a standard (or previous) configuration could be either that the network management system 3 could not be reached by the network element 2 after a remote reconfiguration of critical parameters of the network element 2 has been performed or that an IPSec (Internet Protocol Security) tunnel could not be established after an encryption certificate (especially an IPSec certificate) has been renewed. If the IPSec tunnel could not be established, the network element uses the previous encryption certificate, especially an IPSec certificate, (if still valid) and retries to get the new encryption certificate.

Figure 2:
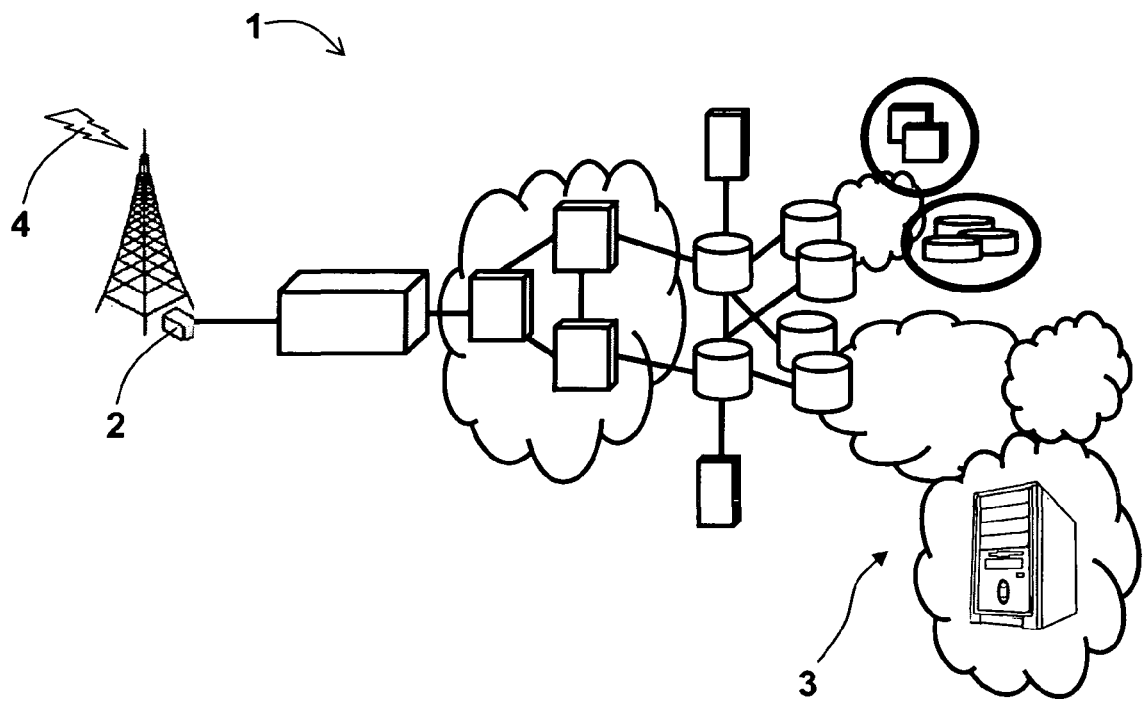
FIG. 2 illustrates schematically an example of a telecommunication network with a remote controlled network element operated according to a method according to an embodiment of the present invention.

In FIG. 2, an example of a telecommunication network 1 with a remote controlled network element 2 operated by the above mentioned method according to the present invention is illustrated. In the present example, the network element 2 (also referred to as "node") comprises a transceiver station of an UMTS radio access network 4. The transceiver station is furthermore connected to a telecommunication network 1 (also referred to as "network") which is managed by a network management system 3.

When the configuration of the node will be changed remotely and as a result the node fails to (re)connect successfully to the network, the node should be able to autonomously fallback to a working configuration. The corresponding trigger condition for a fallback into a previous working configuration is that the network management system 3 could not be reached after a remote reconfiguration of critical parameters. Furthermore a previous encryption certificate (especially an IPSec certificate) is used when an IPSec tunnel could no be established after an IPSec certificate has been renewed.

During a Plug and Play process (failure in connection setup during initial Plug and Play process), several failure scenarios can appear. If one of the below mentioned exemplary trigger conditions appear, the Plug and Play process needs to restart from beginning. The node automatically restores the factory or default settings and starts the Plug and Play process again, if a DHCP (Dynamic Host Configuration Protocol) flow could not be completed, so that the node could not retrieve an IP-address or all expected information (like configuration Server IP-address). Furthermore, the node automatically restores the factory or default settings and starts the Plug and Play process again, if after the successful DHCP process the systems which are retrieved via the additional information fields of the DHCP messages, like the IPSec (Internet Protocol Security) Gateway, a Public Key Infrastructure System and/or the Configuration Server are not reachable, if the DHCP lease time expires and the Plug and Play process has not been finished and/or If the IPSec tunnel could not be established (for example because of IKE (Internet Key Exchange) reject) after initial certificate provisioning. If after a successful auto configuration phase the network management system, the default Gateway and/or the IPSec Gateway could not be reached, each Plug and Play steps should be repeated several times until the whole Plug and Play process is restarted again.

During a normal operation of the remote node, the node automatically restores the factory or default settings and starts an initial configuration and preferably a Plug and Play process, e.g. if the automatic IPSec Tunnel establishment fails (for example: IKE Reject due to invalid or corrupt Certificate), if the Plug and Play process finishes successful, but direct after the Plug and Play process, the network management system 3, the IPSec Gateway and/or the default Gateway can not be reached and/or if a node hardware (board) was replaced which stores transport configuration or certificates. If only the certificate was stored on the replaced board and not the configuration, the node shall only request a new certificate. Furthermore, the node should restore the initial configuration after manually restoring the node to factory settings (e.g. due to redeployment to a different site), in case of unsuccessful rollback to the last working configuration, in case of an issue within certificate process causing that IPSec tunnel can't be established (corrupt certificate, certificate revoked, received wrong certificate) and/or if after a certificate has been replaced by a new one and the IPSec tunnel could not be established because the previous certificate has already been expired.

The node should not fallback to the initial configuration mode (Plug and Play process) or to a previous configuration when the nodes physical interface is down or when a central node failure occurs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

The invention claimed is:

1. A method for operating a remote-controlled network element in a telecommunication network, the method comprising:

configuring the remote-controlled network element with a new configuration;

measuring whether a network connection failure between the remote-controlled network element and a network management system of the telecommunication network exists after configuring the remote-controlled network element with the new configuration; and in response to detecting the network connection failure between the remote-controlled network element and a network management system of the telecommunication network based on the measuring, setting the remote-controlled network element automatically to a standard configuration and establishing a network connection between the remote-controlled network element and the network management system using the standard configuration;

wherein setting the remote-controlled network element automatically to the a standard configuration and establishing the network connection comprises:

loading a previous Internet Protocol Security (IPSec) certificate in case that the previous IPSec certificate has been at least partly replaced during the configuration of the remote-controlled network element with the new configuration; and establishing the network connection between the remote-controlled network element and the network management system using the previous IPSec certificate.

2. The method of claim 1, wherein setting the remote-controlled network element automatically to the standard configuration and establishing the network connection further comprises:

requesting a new IPSec certificate.

3. The method of claim 1, wherein the standard configuration of the remote-controlled network element corresponds to a previous configuration of the remote-controlled network element, the standard configuration having been replaced by the new configuration during the step of configuring.

4. The method of claim 1, wherein the standard configuration of the remote-controlled network element corresponds to the last functioning previous configuration of the remote-controlled network element.

5. The method of claim 1, wherein the standard configuration of the remote-controlled network element corresponds to a default setting, the default setting comprising a factory setting of the remote-controlled network element.

6. The method of claim 5, further comprising:

in response to detecting the network connection failure due to a corrupted Dynamic Host Control Protocol (DHCP), setting the remote-controlled network element to the default setting.

7. The method of claim 5, further comprising:

in response to detecting the network connection failure due an error during establishing an IPSec tunnel between the remote-controlled network element and the network management system, setting the remote-controlled network element to the default setting.

8. The method of claim 5, further comprising:

in response to receiving a manual restoring command, setting the remote-controlled network element to the default setting.

9. The method of claim 1, wherein setting the remote-controlled network element automatically to the standard configuration and establishing the network connection is performed after awaiting a time delay from detecting the network connection failure, wherein the time delay is configurable.

10. The method of claim 1, wherein setting the remote-controlled network element automatically to a standard configuration and establishing the network connection is performed after a plurality of network connection failures have been detected.

11. A non-transitory computer-readable medium having computer-executable instructions stored thereon for operating a remote-controlled network element in a telecommunication network, the computer-executable instructions, when executed by a processor, causing the following steps to be performed:

configuring the remote-controlled network element with a new configuration;

measuring whether a network connection failure between the remote-controlled network element and a network management system of the telecommunication network exists after the configuration; and in response to detecting a network connection failure, setting the remote-controlled network element automatically to a standard configuration and establishing a network connection between the remote-controlled network element and the network management system using the standard configuration;

wherein setting the remote-controlled network element automatically to the standard configuration and establishing the network connection comprises:

loading a previous Internet Protocol Security (IPSec) certificate in case that the previous IPSec certificate has been at least partly replaced during the configuration of the remote-controlled network element with the new configuration; and establishing the network connection between the remote-controlled network element and the network management system using the previous IPSec certificate.

12. The non-transitory computer-readable medium of claim 11, wherein the remote-controlled network element comprises a transceiver station of a radio access telecommunication network.

13. The non-transitory computer-readable medium of claim 11, wherein the computer-executable instructions, when executed, further cause the following step to be performed:

in response to a failure in setting the remote-controlled network element automatically to the standard configuration and establishing the network connection, setting the remote-controlled network element to a default setting, the default setting being a factory setting.

* * * * *